June 28, 1938.                F. TANGEMAN                2,122,302
                            CARTON FILLING DEVICE
                            Filed April 8, 1936
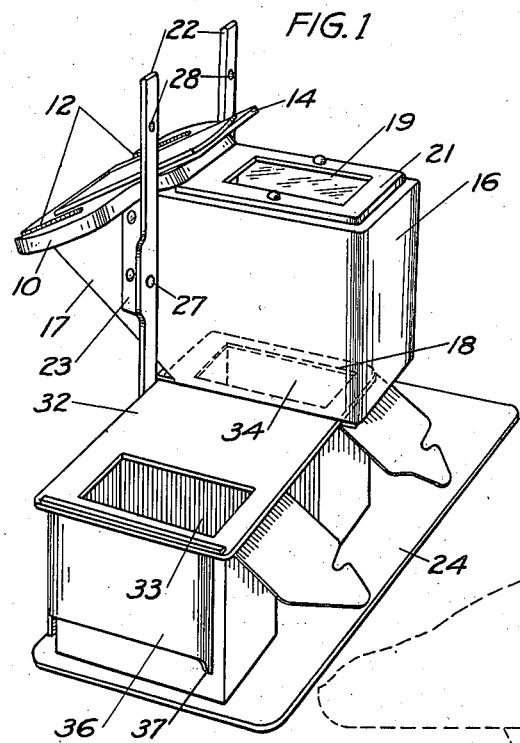
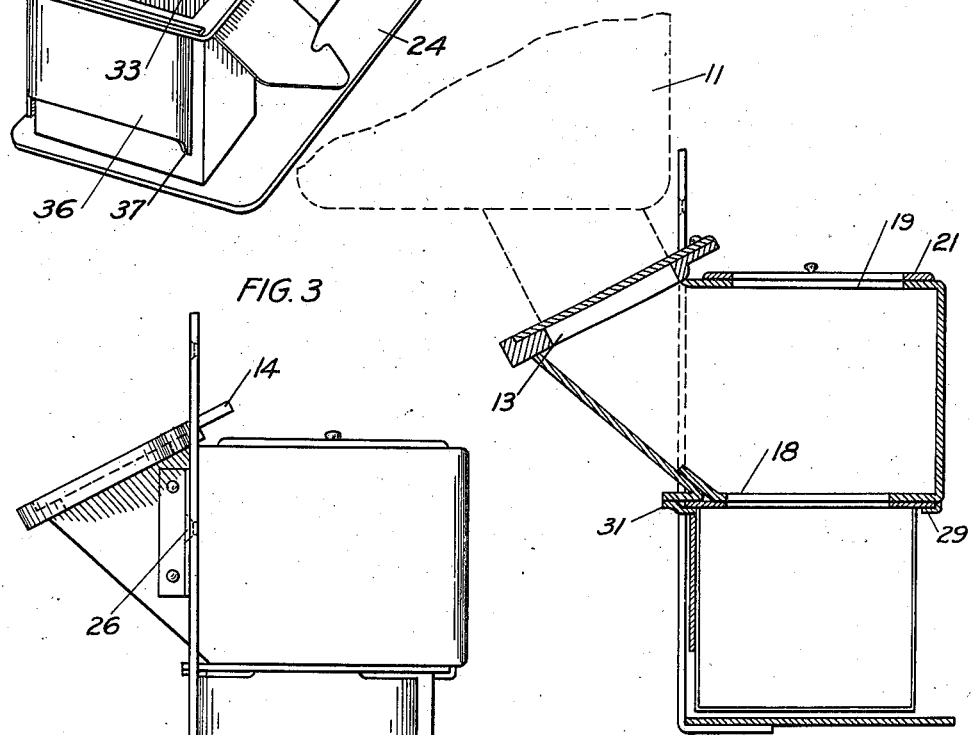
INVENTOR.
FRED TANGEMAN
BY Flournoy Corey
ATTORNEY.

Patented June 28, 1938

2,122,302

UNITED STATES PATENT OFFICE 2,122,302

CARTON FILLING DEVICE

Fred Tangeman, Madison, Wis.

Application April 8, 1936, Serial No. 73,328

2 Claims. (Cl. 226—94)

This invention relates to carton filling devices and has particular relation to a device suitable for filling cartons with semi-fluid materials such as ice cream and the like.

In the manufacture of ice cream, particularly by the manufacturer who makes and sells his own product over the counter, it is the practice to employ a small "counter-freezer" for making the ice cream. The ice cream is usually packaged in a container and placed in the refrigerator ready for sale. In this way the quantity of ice cream kept on hand can be limited and the counter-freezer manufacturer may readily increase or decrease his quantity of packaged stock. In the ice cream manufacturing process, the manufacturer usually purchases ready mixed materials or ice cream "mix" as it is called. This mix is placed in the small counter-freezer in which it is subjected to extremely low freezing temperature and is also beaten at the same time until it becomes of a semi-fluid or partially frozen consistency. In this condition the partially frozen material is poured into cartons and after the cartons are filled they are placed in a refrigerator where the freezing action is completed.

The ice cream manufacturer, particularly the manufacturer who employs the counter-freezer method of making ice cream has difficulty in the carton filling process. It is necessary that a considerable amount of air be whipped into the mix before packaging and close control of the amount of air which is mixed in the ice cream at this point must be maintained. In the ordinary carton filling devices known to the art, the filling of cartons with one batch of material takes considerable time and, as a result, during the first part of the run the mixture is of about the proper air content but, as the cream is withdrawn from the freezer and the air space in the freezer becomes greater and, since the freezer beaters are rotated during the withdrawing operation, more and more air is "whipped into" eration, more and more air is "whipped into" the cream as it is drawn off. In this way the last of a batch may be considerably lighter than the first, with obvious disadvantages. One of the factors which cause this result is the relatively long time required under the usual carton filling methods. Another factor is the lack of packing means for packing the cream. Another difficulty of the prior art devices and methods is that the carton bulges during the filling operation resulting in a greater amount of cream being packed in a carton than was the intent of the manufacturer.

It is a general object of my invention to provide a carton filling means in which the weight, shape and size of the filled carton may be accurately controlled and in which the quantity, over-run and consistency of the mixture is maintained within definite narrow limits.

It is one of the objects of my invention to provide a carton filling machine in which the filling operation for an entire batch of ice cream is quickly accomplished.

Another object of my invention is to provide a carton filling device that is readily adapted to operate in conjunction with a small ice cream freezer such as one usually termed a counter-freezer.

Another object of my invention is to provide a carton filling device in which the filling operation may be practically continuous but in which the filling operation may be interrupted when desired with a minimum of difficulty.

Another object of my invention is to provide a simple and inexpensive carton filling device that may be readily adapted to accommodate various sized cartons.

According to my invention I provide a device that may be attached to a small counter-freezer. The device is so constructed that two empty cartons may be inserted therein. One carton is filled and then while it is being removed and replaced with an empty carton, the second carton is filled and the freezing operation repeated. In this way the carton filling operation is a continuous procedure. My apparatus is so constructed that the filling operation may be conducted with a maximum of efficiency and a minimum of waste of the material being used to fill the cartons.

The novel features that I consider characteristic of my invention are set forth with particularity in the appended claims. The invention, itself, however, both as to its organization and its method of operation, together with additional objects and advantages thereof will best be understood from the following description of a specific embodiment when read in connection with the accompanying drawing, in which:

Figure 1 is a view in perspective of a device embodying the principles of my invention.

Figure 2 is a sectional view taken through the center of the device shown in Figure 1, and Figure 3 is a plane view in side elevation of the device shown in Figure 1.

Referring now to the drawing and Figures 1, 2, and 3, the embodiment of my invention here shown includes a supporting plate 10. The plate 10 is adapted to be secured to the discharge side of an ice cream freezer of the small counter-freezer type, indicated generally at 11.

The plate 10 in the embodiment here shown has slots 12 adapted to receive corresponding posts on the freezer and to be rigidly secured thereto. The plate 10 has an opening 13 extending entirely therethrough. A recessed shoulder is provided around the opening 13 and a slidable plate 14 is inserted therein. The slidable plate 14 is also in close sliding engagement with the discharge nozzle of the freezer by reason of the configuration of the supporting plate 10 and the method of fastening the plate 10 to the freezer 11. The slidable plate 14 serves the purpose of a cut-off valve to control the flow of ice cream out of the freezer.

A box-like hopper 16 having a sloping side 17 is suitably secured to the supporting plate 10 and is supported therefrom in a depending relationship. The box-like hopper 16 is arranged with an opening 18 extending through the bottom thereof and also has an opening 19 through the upper portion. An embossed portion 21 surrounds the opening 19 and is adapted to receive a cover plate thereon.

Two legs 22 are secured to the hopper 16 by means of angles 23. The two legs support at their lower ends a plate 24. The legs 22 are arranged for adjustable relationship with the hopper 16 and may be secured in one position to the angle 23 by means of stud bolts 26 in tapped holes 27 or in another position by engagement of the studs 26 with tapped holes 28. This adjustment permits the adjustment of plate 24 in spaced relationship with the hopper 16 for the purpose hereinafter described.

Two flanged strips 29 and 31 are suitably secured to the bottom of the hopper 16 to provide sheath-like engaging means in conjunction with the bottom wall of the hopper for slidably receiving a plate 32. The plate 32 has apertures 33 and 34 of substantially the same dimensions as the opening 18 in the bottom of the hopper 16. Walls 36 depend from the plate 32 about three sides of the openings 33 and 34. The depending walls adjacent the openings and transverse with the plate 32 are formed with oppositely flaring portions as indicated at 37. The depending walls enclose a space of approximately the dimensions of the containers to be filled and are arranged to provide for retaining two containers simultaneously. The flaring side walls permit insertion of a carton with the greatest possible ease and are so designed that the flaps of the carton top will be pressed downwardly along the side of the carton as the carton is inserted thereon and will not interfere with the filling operation.

As before stated, the legs 22 are arranged to permit adjustment of the plate 34 in spaced relationship with the bottom of the hopper 16 and necessarily the plate 32. Thus, various sized cartons may be inserted in the holders defined by the walls 36 and plate 32, and the top of the cartons will be immediately adjacent the plate 32.

The operation of the above described apparatus may be set forth as follows. The device is first set up to fill a certain sized carton such as the pint size by placing the adjustable legs 22 supporting the plate 24 in the proper position. Two cartons are then inserted in the carton holding device defined by the plate 32 and the depending side walls 36.

The plate 14 is then disengaged to permit the ice cream from the freezer to flow into the hopper 16. The plate 32 is slidably adjusted until one of the apertures such as 34 indicated in dotted lines in Figure 1, and the carton beneath are directly beneath aperture 18 in the hopper 16. The ice cream flowing from the freezer into the hopper 16 is then directed from the hopper into the carton. When the filling operation is completed, as may be ascertained by the operator by looking through opening 19 in the upper face of the hopper, the carton holder is then slidably adjusted until the opening 33 and the adjacent carton are beneath the hopper and corresponding opening 18.

During the time of transition when a filled carton is being replaced by the adjacent empty carton through slidably adjusting the holder, the solid portion of the plate 32 between the apertures 33 and 34 serves as a cut-off to check the flow of ice cream from the hopper. It is obvious that one carton may be filled, the holder slidably adjusted and the other carton filled. During the time occupied in filling the second carton the first filled carton may be removed and replaced by an empty carton and the above operation may be repeated.

Thus, a continuous filling operation is assured and the freezer of ice cream may be emptied rapidly to insure a uniform quality of ice cream. In addition the filling operation is conducted with a minimum of loss and a maximum of efficiency.

Although I have shown and described a certain specific embodiment of my invention, I am fully aware that many modifications thereof are possible. My invention, therefore, is not to be restricted except insofar as is necessitated by the prior art and by the spirit of the appended claims.

I claim as my invention:

1. A carton filling mechanism adapted for use with a counter freezer comprising a hopper adapted to be secured to the spot of the freezer, a plate slidably mounted between the spout of the freezer and the hopper for selectively closing off the freezer, the hopper having an opening in the bottom thereof, depending legs on the hopper, and a carton supporting plate secured to the legs, a plate mounted for reciprocatory movement beneath the hopper and adapted to selectively close and open the bottom of the hopper, the plate having an opening therein for the purpose of permitting cream to flow from the hopper, and adjustable means on the depending legs to permit vertical adjustment of the first named plate to bring the tops of the cartons into closed position with the bottom side of the second named plate, and depending walls depending from the last named plate and arranged to surround the cartons on at least two sides whereby reciprocatory movement of the last named plate causes reciprocatory movement of the cartons, the clearances of the hopper and associated parts being such that a closed conduit is provided from the freezer into the cartons.

2. A carton filling mechanism adapted for use with a counter freezer comprising, a substantially rectangular hopper, and means for securing the hopper to the spout of the freezer, a valve plate adapted for reciprocatory movement between the hopper and the spout of the freezer to close off the flow of cream into the hopper, depending legs secured to the hopper and depending therebelow, said legs being each formed in two parts to permit vertical adjustment of the lower portions thereof, a carton supporting plate secured to the lower portions of the legs, a cut-off plate mounted for reciprocatory movement beneath the hopper and arranged in sliding relation thereto, a cut-off plate having an opening therethrough at one portion thereof, and the cut-off plate having depending plates arranged to engage the cartons on at least two sides thereof to cause reciprocatory movement of the cartons on reciprocatory movement of the cut-off plate.

FRED TANGEMAN.